DISTORTION CORRECTION CIRCUITRY FOR DATA TRANSMISSION SYSTEMS

Filed Sept. 30, 1963 4 Sheets-Sheet 1

INVENTORS
EMIL HOPNER
HOWARD L. FUNK
DALE L. CRITCHLOW

BY Edward G. Fiorito
ATTORNEY

March 7, 1967 E. HOPNER ET AL 3,308,431

DISTORTION CORRECTION CIRCUITRY FOR DATA TRANSMISSION SYSTEMS

Filed Sept. 30, 1963 4 Sheets-Sheet 2

ATTENUATOR CONTROL

3,308,431
DISTORTION CORRECTION CIRCUITRY FOR DATA TRANSMISSION SYSTEMS

Emil Hopner, Los Gatos, Calif., Howard L. Funk, Yorktown Heights, N.Y., and Dale L. Critchlow, St.-Laurent-du-Var, France, assignors to International Business Machines Corporation, New York, N.Y., a corporation of New York Filed Sept. 30, 1963, Ser. No. 312,725
9 Claims. (Cl. 340—147)

This invention relates to data transmission systems and more particularly to apparatus for correcting distortion in such systems.

Transmission channels, particularly telephone lines, are known to create distortion when data is transmitted over the channel. For example when data is sent in the form of a pulse, it is frequently received in the form of a main peak followed by a number of trailing peaks of lesser amplitude, the latter peaks commonly called ringing distortion. In order to detect the data at the receiving end of the channel, the pulses are frequently transmitted a sufficient distance apart so that the ringing distortion dies out before the next main peak is received. This, of course, reduces the volume of data that can be transmitted by the channel.

As the density of the data in the channel becomes high, distortion from one pulse interferes with the detection of an adjacent pulse. Various schemes have been devised for correcting this distortion, including time domain equalization schemes employing tapped delay lines at the receiver. However, the setting of the taps must be performed rapidly or the time lost for correction cannot be recouped by the higher density of the data. The problem of rapid correction becomes even more acute where the transmission channel changes frequently. For example, where telephone lines are used, each time a new number is dialed, the transmission channel is changed and the characteristic distortion is different. Further, even where the same number is dialed, different paths are likely to be followed so that the characteristic distortion is different, requiring a new correction before data can be transmitted in the most efficient way.

An object of the invention is to provide an improved data transmission system.

A further object of the invention is to provide a data transmission system capable of rapidly correcting for distortion caused by a transmission channel.

It is a further object of the invention to provide apparatus for rapidly correcting distortion in data transmission systems wherein the transmission channel is frequently changed.

These and other objects are accomplished in accordance with the broad aspects of the present invention by providing a receiver capable of sampling the incoming distorted waveform at certain times. The main peak of the distorted waveform is sampled along with one or more points in the trailing portion of the waveform. The interval between samples is chosen to be equal to the reciprocal of the data pulse transmission rate.

In operation, a quantity of the main peak sample is added to the samples taken from the trailing portion of the distorted wave so that the sum of all of the samples taken is equal to zero. The zero adjustment is repeated upon an increasing number of samples in the trailing portion of the waveform until the amplitude of the trailing distortion has diminished to a sufficiently low level. The transmitter is caused to generate pulses separated by a distance sufficient to prevent the trailing distortion of one pulse to interfere with the main peaks of adjacent pulses. In this manner the output of the receiver is caused to approach zero amplitude at those sampling times other than the time when a main peak is received.

In accordance with a more detailed aspect of the present invention, a delay line is provided with equally spaced taps. The distorted waveform is supplied to the delay line. The taps are connected to a summing amplifier. Adjustments are made to the signals appearing at the taps so that the output of the summing amplifier is made to approach zero at the sampling times. In addition, the distorted waveform is supplied directly to the summing amplifier, without delay. In this manner the output of the summing amplifier can be forced to equal zero at all sampling times other than at the sampling time when the main peak first occurs.

An advantage of the invention is that the data pulses can be transmitted close together without causing interference between the received main peak of one waveform and the trailing portion of an adjacent waveform. Therefore a larger volume of data can be transmitted.

A feature of the invention is the ability of the system to use a single transmitter connected via different transmission channels to a plurality of receivers. Since the distortion correction is independently achieved at each receiver, there being no correction at the transmitter end of the system, no limitation is placed upon the number of receivers that can be serviced by a single transmitter.

Another advantage of the invention is the ability to correct by apparatus wholly contained within the receiver. The necessity of feed-back signals to the transmitter for distortion correction at the sending end of the transmission system is not required.

The foregoing and other objects, features and advantages of the invention will be apparent from the following more particular description of a preferred embodiment of the invention, as illustrated in the accompanying drawings.

Figure 1:
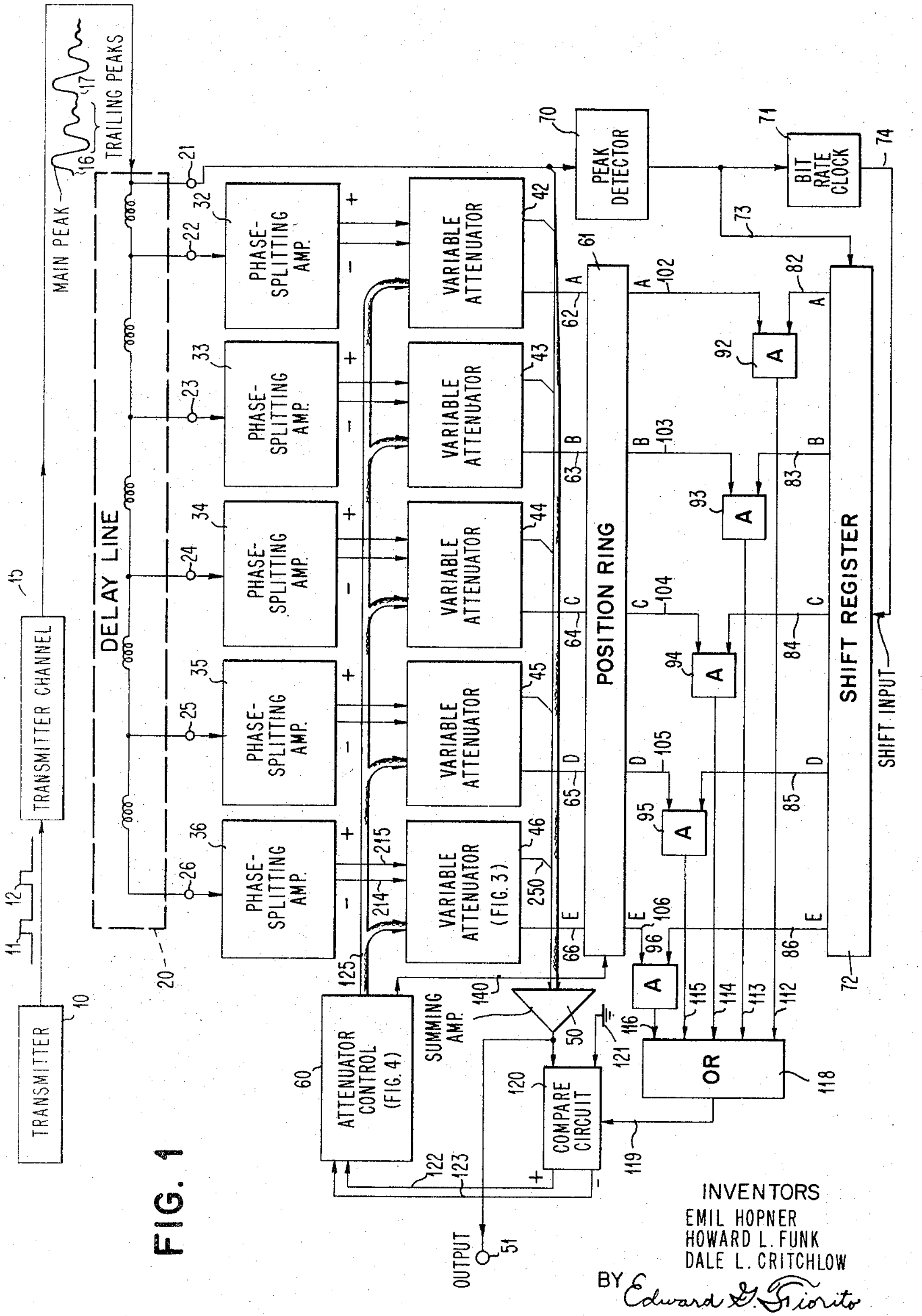
FIG. 1 is a schematic diagram illustrating a data transmission system embodying the present invention.

The general operation of the data transmission system is illustrated in FIG. 1. Prior to sending the actual data, the system is adjusted so that the effect of distortion during transmission is reduced. After the adjustment is made, then the data can be transmitted at a higher rate than would be possible if there were no correction for distortion.

A transmitter 10 is shown sending two pulses 11 and 12 through a transmission channel 15. The transmission channel introduces distortion so that the resulting waves are in the form illustrated by distorted waveforms 16 and 17. The waveform 16 includes a main peak and a plurality of trailing peaks of lesser amplitude.

The separation between the pulses 11 and 12 is selected so that the trailing peaks of waveform 16 die out before the main peak of waveform 17 arrives.

A delay line 20 is provided with a plurality of taps 21–26. Each of the taps 21–26 is separated by an equal amount of delay. The delay is selected to be equal to the reciprocal of the rate at which data bits, such as pulses 11 and 12, will ultimately be transmitted through the system. The length of the delay line 20 need only be sufficient to accommodate a single distorted waveform such as waveform 16. The signals appearing on taps 22–26 are fed through phase-splitting amplifiers 32–36 and variable attenuators 42–46. The outputs of attenuators 42–46 and the output of tap 21 are fed directly to a summing amplifier 50.

The output of the summing amplifier 50 is supplied to an output terminal 51.

*General operation of FIG. 1*

Before describing the operation of the system in FIG. 1 in detail the general operation and the end results achieved are presented below.

A positive signal is made to appear on output terminal 51 when the main peak of the distorted waveform 16 arrives at tap 21. A signal of zero amplitude is caused to appear on output terminal 51 when the main peak arrives at tap 22. Likewise, when the main peak arrives at taps 23–26, the signal on output terminal 51 is caused to approach zero. In this manner, by examining the signal on output terminal 51, only when the main peak arrives at taps 21–26, a positive signal is observed only once, during the appearance of the main peak at tap 21.

Since the delays between the taps 21–26 are chosen to be equal, the output terminal 21 can be sampled at regular intervals to determine when the main peak of a distorted waveform arrives at tap 21. Although the signal on output terminal 51 may vary considerably while the main peak is passing between taps 21–26, the output is always at zero when the main peak arrives at any of the taps 22 to 26.

Once adjustments have been made to provide the output at terminal 51, as described above, pulses can be transmitted by the transmitter 10 spaced at much closer intervals than pulses 11 and 12. In fact, pulses may be spaced at intervals corresponding to the delays between taps 21–26. It is apparent that such closely spaced pulses would emerge from the transmission channel 15 with their trailing peaks overlapping one or more main peaks of adjacent waveforms. It is quite likely that the summation of overlapping trailing peaks may create a composite waveform having a larger amplitude than the main peaks. However, provided the transmission channel 15 causes linear distortion of the data pulses, the output on terminal 51 is positive each time a main peak occurs at tap 21, and the output on terminal 51 is zero whenever main peaks occur at taps 22–26 regardless of the amplitude of the signal appearing at terminal 21 due to the super position of trailing peaks. This latter attribute of the system of FIG. 1 will be apparent from the following more detailed description.

*Detailed description of FIG. 1*

The signals on taps 22–26 are fed into phase-splitting amplifiers 32–36. Each of the amplifiers 32–36 have an in-phase output and an out-of-phase output designated respectively by the (+) and (−) signs adjacent their outputs in FIG. 1. The variable attenuators 42–46 select either the in-phase output (+), or the out-of-phase output (−) from the amplifiers 32–36. The signal is attenuated before being supplied to the summing amplifier 50. The setting of the attenuators 42–46 is accomplished by an attenuator control 60. Each attenuator 42–46 is set independently by control 60. A position ring 61 selects the particular one of the attenuators 42–46 to be acted upon by the control 60. Each of the attenuators 42–46 is connected to a different one of the positions A–E of ring 61 through connecting lines 62–66.

In order to synchronize the operation of the system shown in FIG. 1 with the incoming waveform, a peak detector 70 and a bit rate clock 71 are provided. The peak detector receives the output from tap 21 and detects the occurrence of a main peak. The peak detector may be any well-known threshold device which responds to signals above a predetermined amplitude. The bit rate clock is connected to the output of the peak detector and is tuned to create clock signals at the rate which data bits will ultimately be transmitted by the transmitter 10 after the distortion correction is made. The interval between clock pulses is also equal to the interval of delay between taps 21–26 due to the original selection of the taps on the delay line 20.

The peak detector 70 supplies an input to a shift register 72 through line 73. The clock 71 supplies a shift input signal to shift register 72 through line 74. Each time a clock pulse occurs on line 74, the signal provided by line 73 is shifted down the shift register from position A toward position E. For example, after the peak detector 70 supplies a pulse, one bit interval later a pulse from clock 71 causes the line 82 at position A of the shift register to be energized. Therefore when position A is energized, the main peak is at tap 22. The next clock pulse generated by clock 71 advances the pulse in the shift register from position A to position B thereby energizing line 83. The main peak is now at tap 23. Subsequent signals on shift input line 74 causes lines 84–86 to be energized sequentially.

Lines 82–86 are supplied to AND gates 92–96 respectively. Also supplied to AND gates 92–96 are lines 102–106 from position ring 61. As in the case of lines 62–66, the lines 102–106 are sequentially activated by the ring 61 as it advances from position A toward position E. In operation, when the ring 61 and register 72 are both in the same position, i.e., one of positions A–E, the associated AND gate, i.e., one of gates 92–96, is activated. For example, when ring 61 is stationed at position A and the shift register has advanced to position A, line 82 and line 102 supply signals to AND gate 90 thereby enabling a line 112. In another example, when ring 61 is stationed at position B and the shift register 72 advances to position B, lines 83 and 103 enable AND gate 93, which in turn provides a signal on line 113. When AND gates 94–96 are enabled in a similar manner, signals are provided on lines 114–116, respectively.

Lines 112–116 are connected to an OR gate 118. The OR gate 118 generates a signal on line 119 whenever a signal is provided on one of the lines 112–116.

The appearance of a signal on line 119 can be described with respect to the waveform 16 and the operation of the ring 61 and register 72. For example, if the ring is stationed at position A, a signal is generated on line 119 when the main peak arrives at tap 22. When the ring 61 is at position B, a signal is generated on line 119 when the main peak is at tap 23. It can be seen that a signal is provided on line 119 each time a main peak arrives at one of the taps 22–26.

The signal on line 119 is supplied to a compare circuit 120. As soon as a signal is supplied on line 119, compare circuit 120 samples the output of the summing amplifier 50. The sample is compared with a ground reference 121. If the sample is positive, a signal is sent by line 122 to one input of the attenuator control 60. If the sample is negative with respect to ground, a signal is sent by line 123 to another input of attenuator control 60.

Control signals are fed through a cable 125 to each of the attenuators 42–46. However, only that attenuator having a signal supplied thereto by one of the lines 62–66 is activated by the signals on cable 125. The remainder of the attenuators maintain their settings and are unaffected by any signals on cable 125.

The operation of the system of FIG. 1 is described assuming the ring 61 to be initially at position A and the shift register 72 to contain no signals from line 73. Therefore, the position ring activates line 62 allowing the control signals on cable 125 to affect the settings in attenuator 42 only.

Figure 2:
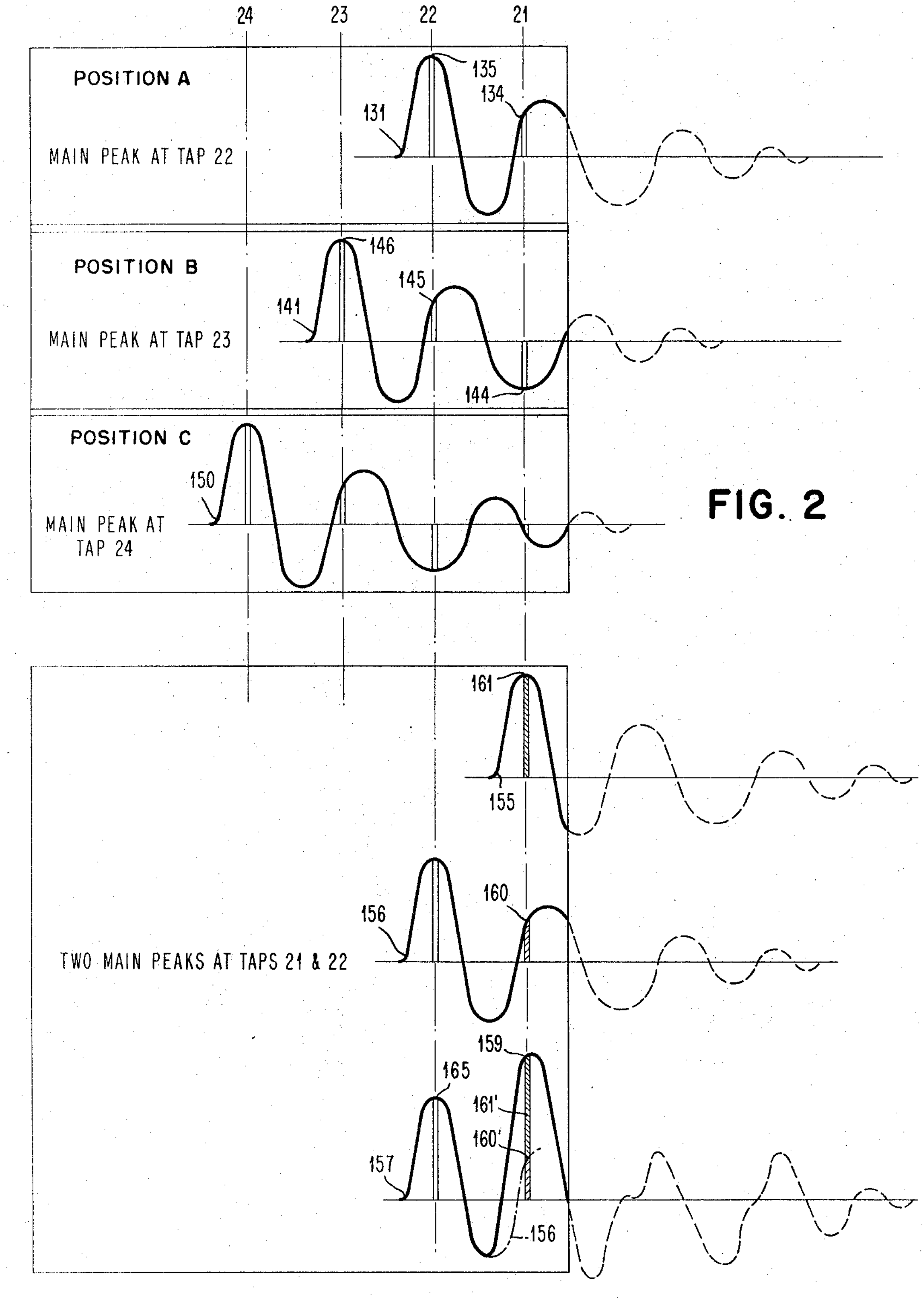
FIG. 2 is a waveform diagram illustrating the position of the distorted waveform within the delay line at different sampling times.

When the main peak of waveform 16 arrives at tap 21, a signal is sent by peak detector 70 to the shift register 72. The waveform 16 continues to travel down the delay line 20 until the main peak arrives at tap 22. At this time, the bit rate clock 71 sends a signal to the shift input of the shift register 72. The shift register advances to position A causing a signal to appear on line 119 in a manner as described above. The position of the received waveform within the delay line is illustrated in FIG. 2 by waveform 131. The main peak is at tap 22. Another point in the trailing portion of the waveform is at tap 21. The amplitude of the signals at the taps 21 and 22 are indicated by samples 134 and 135 respectively. The sample 134 is fed directly to amplifier 50. The sample 135 is fed through phase-splitting amplifier 32 and attenuator 42. Attenuator 42 is initially set so that the in-phase output of amplifier 32 is selected and no attenuation is performed. At the instant of time when the compare circuit 120 is gated by the signal on line 119 the output of the summing amplifier 50 represents the sum of the samples 134 and 135. The compare circuit 120 compares the addition of samples 134 and 135 with the reference of ground 121. In this case, the output of amplifier 50 is positive and a signal is sent on line 122 to the attenuator control 60. The attenuator control 60 causes the variable attenuator 42 to select the out-of-phase signal (−) from phase-splitting amplifier 32. Therefore, the output from the variable attenuator 42 is caused to be negative.

The magnitude of the negative signal supplied by attenuator 42 is adjusted by control 60 so that when it is added to the output from attenuator 43, the result of the addition approaches zero. Referring to FIG. 2, this addition can be shown graphically by considering sample 135 to be attenuated down to a magnitude equal to the sample 134. This portion of sample 135 is inverted and added to the sample 134 causing the resulting addition to approach zero.

After the attenuator control 60 has accomplished its objective of setting attenuator 42 so that the output of the summing amplifier approaches zero, the ring 61 is stepped to position *b* in response to a signal on line 140. The shift register 72 is cleared by a number of clock signals from clock 71 during the interim between the arrival of the main peaks. When the next main peak is detected by peak detector 70 and the shift register has advanced to position B, a signal is generated on line 119. At the instant of time when compare circuit 120 is gated by the signal on line 119, the main peak of the waveform is at tap 23. The position of the waveform within the delay line when the ring is at position B is illustrated in FIG. 2 by waveform 141.

At this time variable attenuator 43 is activated by a signal on line 63, while the remaining attenuators 42 and 44–46 are insensitive to signals from attenuator control 60. The signals appearing at taps 21–23 are represented by samples 144–146 respectively. Sample 144 is fed directly to summing amplifier 50. Sample 145 is phase inverted and attenuated by variable attenuator 42 due to the previous settings of attenuator 42. Sample 146 is fed through phase-splitting amplifier 33 and variable attenuator 43 without phase-inversion or attenuation due to the initial setting of attenuator 43.

The summing amplifier 50 adds the three samples 144–146 together, the sample 145 being attenuated and inverted. Although the signal received from tap 21 and the signal received from attenuator 42 are negative, it can be seen that the large positive sample 146 from attenuator 43 tends to overbalance the two negative signals causing a positive output from the summing amplifier 50. The positive output is compared by circuit 120 and a signal sent via line 122 to the attenuator control 60. Variable attenuator 43 is set to accept the out-of-phase output (−) from phase-splitting amplifier 33. Adjustment is made to attenuator 43 so that the output of summing amplifier is made to approach zero.

Upon completion of the adjustment of attenuator 43 a signal is sent from control 60 via line 140 to position ring 61. The ring is advanced from position B to C. Adjustments are now made to variable attenuator 44. The position of the waveform in the delay line 20 at the time adjustments are made to attenuator 43 is illustrated in FIG. 2 by waveform 150. Again the adjustment causes the summing amplifier 50 to provide an output approaching zero when the main peak is at tap 24. Similar adjustments are made to attenuator 45 and attenuator 46 when the ring 61 is at positions D and E respectively.

Since no compensation has been made at tap 21 when the main peak of a waveform arrives, the summing amplifier immediately responds by providing a positive output at terminal 51. However, at all other times when the main peak is at taps 22–26 the output on terminal 51 approaches zero. Therefore, if the output 51 is sampled at times corresponding to the appearance of a main peak at the taps 21–26, an output signal is sampled only when the main peak appears at tap 21.

Once the variable attenuators 42–46 have been adjusted in the manner described above, a plurality of closely spaced pulses can be transmitted over channel 15 without affecting the operation of the system. It must be assumed however that the transmission channel 15 linearly distorts the applied pulses so that the composite wave is equal to the sum of the component distortions due to each transmitted pulse.

In order to illustrate this, waveforms 155–157 are shown in FIG. 2. Waveform 155 represents the distorted waveform created by the transmission channel 15 in response to a single transmitted pulse. Waveform 156 represents a response to another pulse separated only by an interval of time equal to the delay between taps 121 and 122. The main peak of waveform 155 overlaps the trailing portion of waveform 156. Therefore, the composite waveform 157 received from transmission channel 15 in response to the two closely spaced pulses is merely the addition of the two waveforms 155 and 156. It should be pointed out however that where the distortion departs from linearity the composite waveform would not be the simple sum of the two waveforms 156 and 155.

The operation of the system of FIG. 1 in response to waveform 157 can be described by considering the system response to the individual waveforms 155 and 156. The output on terminal 51 is sampled when the two main peaks are at taps 21 and 22. The sample 159 of waveform 157 is made up of two components, samples 160′ and 161′. The sample 159 is fed directly to the summing amplifier 50. The sample 165 is phase-inverted and attenuated in accordance with the previous setting made during the correction operation. The attenuated sample 165 cancels the portion 160′ of sample 159, since the samples 165 and 160′ are directly equivalent to samples 135 and 134 respectively. Therefore, the output of the summing amplifier 50 represents the remaining portion of sample 159, or sample 161′.

From the above description it can be seen that the main peak of waveform 155 is completely uneffected by the trailing portion of waveform 156. Because of this operation, each time a main peak arrives at tap 21, it is detected by the summing amplifier 50 without interference from the trailing portion of any previous waveform.

When the composite waveform 157 advances to a next tap 23, the component parts can be illustrated by observing the waveforms 131 and 141. At this time no main peaks are at tap 21. The two main peaks are at taps 22 and 23 and the output on terminal 51 is zero. This may be seen by examining the inputs to amplifier 50 in detail. The signals fed to the summing amplifier 50 are modified as follows: sample 146 is inverted and attenuated; samples 135 and 145 are inverted and attenuated; and, samples 134 and 144 have no inversion or attenuation. Sample 146 effectively cancels samples 145 and 144 without regard to samples 135 and 134. Likewise, sample 135 effectively cancels 134 without regard to samples 144–146. Therefore the sum of all of the samples 134, 135, 144, 145, and 146, after their respective inversion and attenuation, is zero. This result is the one desired since no main peak exists at tap 21 for this condition.

Figure 3:
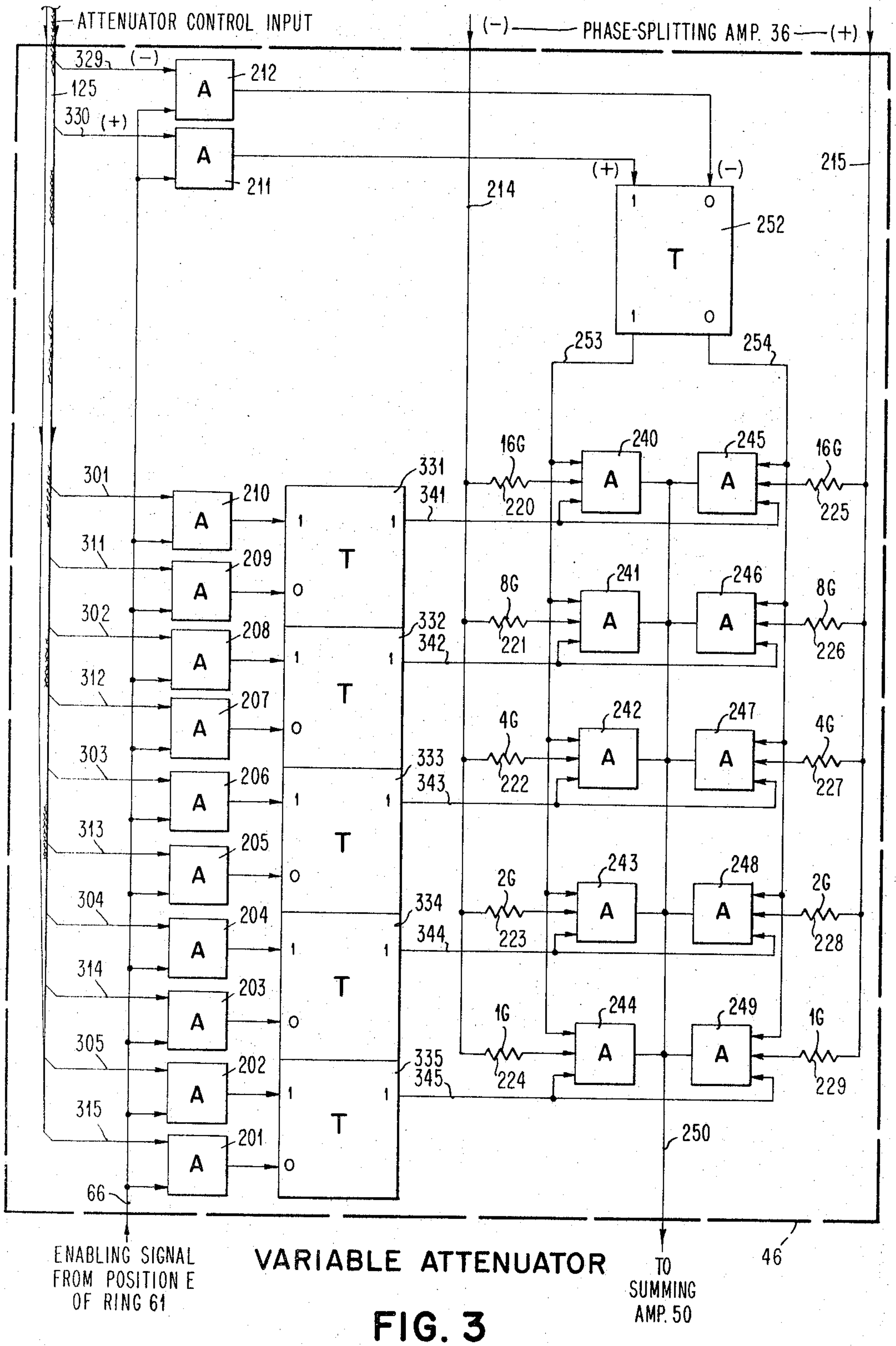
FIG. 3 is a schematic diagram illustrating one embodiment of a variable attenuator in FIG. 1.
Figure 4:
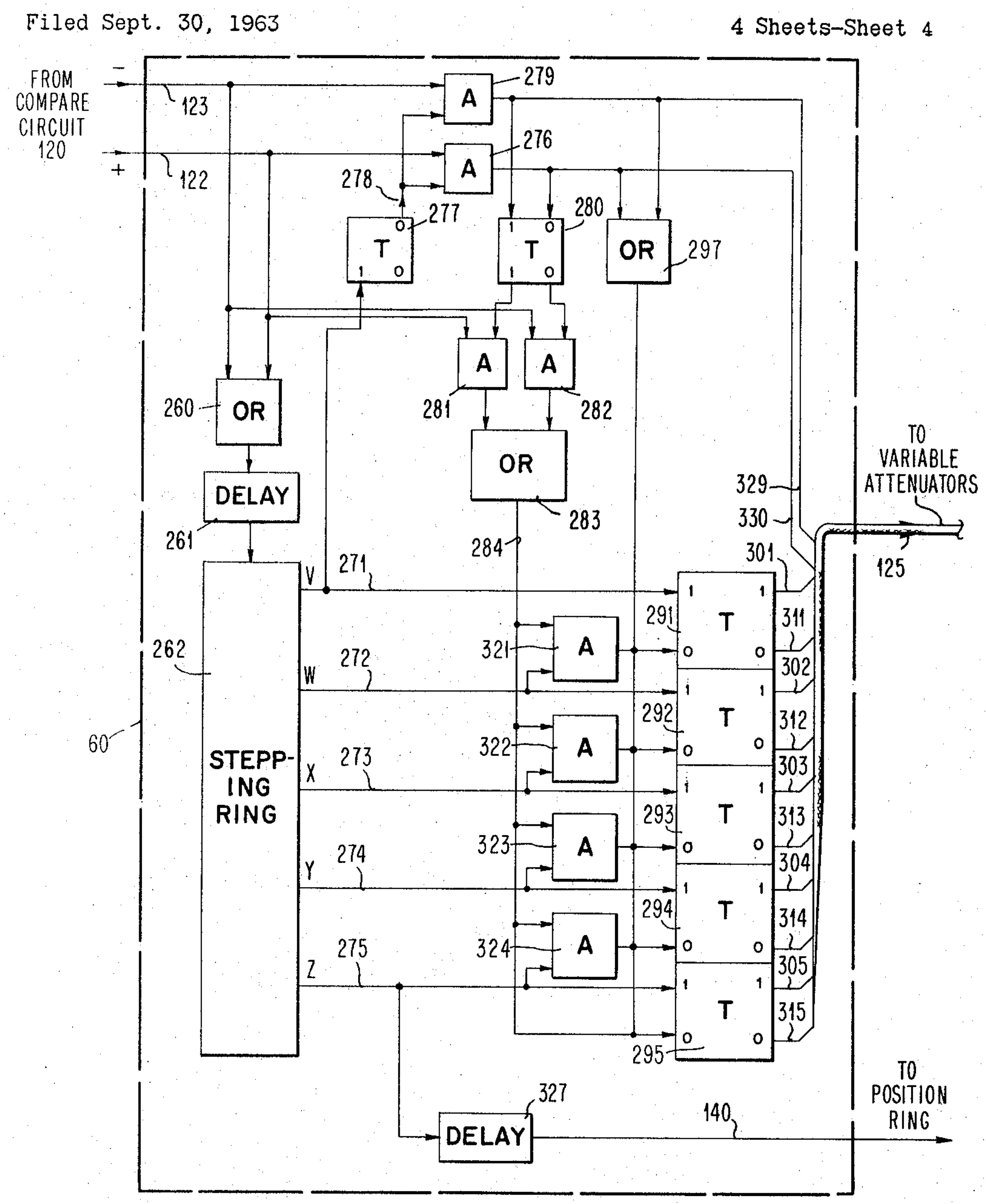
FIG. 4 is a schematic illustrating one embodiment of the attenuator control in FIG. 1.

*Detailed description of FIGS. 3 and 4*

Attenuator control 60, variable attenuators 42–46, summing amplifier 50 and compare 120 perform the function of a servo-mechanism. The null is achieved at the output terminal 51 in response to a plurality of inputs from taps 21–26. It is apparent that many types of servo-mechanisms could be employed to perform the function of the attenuator control 60 and variable attenuators 42–46. However, one preferred implementation of the attenuator control 60 and variable attenuators 42–46 is described below.

FIG. 3 illustrates one implementation of the variable attenuators 42–46. Variable attenuator 46 is selected as the subject of discussion so that the inputs and outputs can be labeled to correspond with those in FIG. 1. When a signal is supplied to line 66 from position E of ring 61, the variable attenuator is rendered responsive to the signals on cable 125. This is accomplished by providing AND gates 201–212 which allow signals from cable 125 to pass only when a signal on line 66 is present. The outputs from phase-splitting amplifier 36 are applied to lines 214 and 215.

Attenuation is accomplished by resistors 220–229. The relative magnitude of the conductance of these resistors is indicated above each resistor in FIG. 3. For example, the conductance of resistor 220 is twice as large as resistor 221. AND gates 240–249 serve to selectively connect the one or more of the resistors 220–229 to line 250. The line 250 supplies the attenuated signal to summing amplifier 50. The amount of attenuation is dependent upon the particular resistors selected to be connected to line 250.

A trigger 252 is set by the outputs from AND gates 211 and 212. For example, when AND gate 211 supplies a signal, trigger 252 is set in the one state. Therefore, an output is present on line 253, while no output is present on line 254. In a similar fashion, a signal from AND gate 212 sets trigger 252 in the zero state. Therefore, an output signal is present on line 254, while no output signal is present on line 253. When the trigger is in the one state, AND gates 245–249 are prevented from connecting resistors 225–229 to line 250. In a similar manner, when trigger 252 is in the zero state, resistors 220–224 are prevented from being connected to line 250. AND gates 240–249 are operated in response to signals coming from Control 60. Therefore the details of the control 60 are described below.

FIG. 4 illustrates one implementation of the attenuator control 60. The signals from compare circuit 120 are fed through an OR gate 260 and a delay 261 to a stepping ring 262. Each time a signal is gated out of compare circuit 120, the stepping ring advances one position, from position V to position Z. Each position of the stepping ring 262 provides an output signal on an associated output line 271–275.

A trigger 277 is initially in the zero state. Therefore, a signal is supplied via line 278 to AND gates 279 and 276 enabling them to pass any signals appearing on lines 123 and 122. When a signal appears on line 271, trigger 277 is set into the one state. No output signal is supplied on line 278 so that AND gates 279 and 276 are in a blocking condition.

In the initial condition, no signals are supplied on lines 271–275 by the stepping ring. When the first signal appears on line 122 or line 123 the stepping ring advances, supplying a signal on line 271. However, the signal on line 271 is delayed by delay 261 so that the signal from compare circuit 120 can pass through AND gates 279–276 before trigger 277 is set in the one state. If the initial signal is on line 123, a signal appears at the output of AND gate 279, setting trigger 280 into the one state. An initial signal on line 122 sets trigger 280 into the zero state. Once the signal from line 271 sets trigger 277 into the one state, the AND gates 279 and 280 are blocked so that trigger 280 maintains the setting regardless of changes in the signals from compare 120.

The trigger 280 is used to detect a change in the sign of the signals from compare circuit 120 after the initial setting. This is accomplished by providing AND gates 281 and 282. The outputs of AND gates 281 and 282 are supplied to an OR gate 283. OR gate 283 supplies an output on line 284 whenever the setting of trigger 280 disagrees with the signals on lines 122 and 123. For example, if the initial signal from compare circuit 120 appears on line 123, the trigger is set into the one state. Therefore, AND gate 281 receives one signal from trigger 280. If the compare circuit provides a signal on line 122 at a later time, the second input to AND gate 281 is conditioned. Therefore an output is provided to OR gate 283 which in turn supplies a signal to line 284.

In operation, the stepping ring advances to position V in response to the first signal from compare circuit 120. Trigger 280 is set into the one or zero state in response to the sign of the signal supplied to the compare 120. The output lines 271–275 of stepping ring 262 are connected to triggers 291–295. The triggers 291–295 are initially set to the one state and are reset to the zero state by a signal from an OR gate 297 in response to a signal from either AND gate 279 or AND gate 276. When trigger 291 is set into the one position by a signal on line 271, a signal is provided on line 301. In a like manner, whenever triggers 292–295 are set into the one state, signals are supplied on lines 302–305. When the triggers 291–295 are set in the zero state, signals are supplied on output lines 311–315 respectively.

When a second signal comes from compare circuit 120, the stepping ring is advanced to position W. A signal is provided on line 272 which sets trigger 292 into the one state, thereby providing a signal on line 302. The signal on line 272 is also supplied to one input of an AND gate 321. The other leg of AND gate 321 is connected to line 284. As described above, if there is a mismatch between the sign of the signal from compare circuit 120 which initially set trigger 280 and the sign of the second signal from compare circuit 120, a signal appears on line 284. Therefore, in case of a mismatch, AND gate 321 is enabled and the output of AND gate 321 sets trigger 291 into the zero state. The signal on line 301 is extinguished and a signal is now present on line 311. AND gates 322–324 each operate in a similar manner. That is, each time a mismatch is detected by trigger 280, the previous trigger is turned off while the next trigger is turned on.

When the Z position of the stepping ring 262 is reached, a signal is supplied on line 275 which indicates that the setting of the attenuator is complete. The signal on line 275 is supplied to delay 327 which in turn supplies an output on line 140 connected to position ring 61 in FIG. 1. This advances the position ring 61 so that the attenuator control 60 can operate upon the next variable attenuator. The delay 327 is inserted so that the position ring 61 is not advanced until after the trigger 295 has completed switching.

The outputs 279 and 276 are connected to cable 125 by lines 329 and 330 respectively. The cable 125 is shown connected to the input of the variable attenuator shown in FIG. 3. The lines coming from cable 125 in FIG. 3 are identified by the same numbers that are used in FIG. 4 for the inputs to cable 125. Referring to FIG. 3 the initial signal from compare circuit 120 appears either on line 329 or line 330. Assuming the signal is present on line 66, trigger 252 is set in the one state in response to a signal on line 330. The trigger 252 provides a signal on line 253 which enables AND gates 240–244. The out-of-phase side (−) of phase-splitting amplifier 36 provides signals to line 214 which in turn supplies signals to AND gates 240–244. Therefore, if the compare circuit 120 indicates that the output of the summing amplifier 50 is positive, the variable attenuator accepts the out-of-phase signal (−) from the phase-splitting amplifier 36 and rejects the in-phase signal (+) on line 215. The setting of trigger 252 is maintained throughout the adjustment of the attenuator since AND gates 279 and 276 in FIG. 4 prevent any signals from reaching lines 329 and 330 as discussed above.

The outputs of AND gates 201–210 are supplied to triggers 331–335. The outputs of triggers 291–295 in FIG. 4 are connected through cable 125 and AND gates 201–210 to triggers 331–335 respectively. Therefore, the state of each of the triggers 331–335 is made to agree with the state of triggers 291–295 respectively.

When trigger 331 is in the one state, a signal is supplied on line 341 to both AND gate 240 and AND gate 245. However, only one of the AND gates 240 or 245 is enabled depending upon the setting of trigger 252. If for example, trigger 252 is in the one state, a signal is present on line 253 and line 341, AND gate 240 is enabled. This places resistor 220 into the circuit between the out-of-phase output (−) of amplifier 36 and summing amplifier 50. In a similar manner triggers 232–235 supply signals on lines 342–345 which control the connection of resistors 221–224 into the circuit between amplifier 36 and summing amplifier 50.

Where only resistor 220 is connected via AND gate 240 to the output line 250, about one half of the full scale output of the attenuator is produced. That is, since the relative weight of the conductance of resistor 220 is 16, this represents about ½ of the relative total of the conductances, i.e. 31, which were initially set into the circuit due to the original setting of triggers 291–295 in the one state prior to being reset by OR gate 297. The absolute value of the conductances of resistors 220–229 would ultimately depend upon the internal conductance of the summing amplifier 50. However, for purposes of description, the absolute value need not be discussed, such design details being well within the ability of one skilled in the art.

If the connection of resistor 220 to the output line 250 causes the output of summing amplifier 50 to change sign, then AND gate 240 is turned off while AND gate 241 is turned on. This result is brought about by observing the signal on line 272 in FIG. 4, which turns trigger 291 off and trigger 292 on.

If as a result of connecting resistor 221 into the circuit, the sign of the output of amplifier 50 is the same as the initial sign observed by compare circuit 120, the resistor 221 is left in the circuit and resistor 222 is connected to output line 250.

This trial and error technique is continued on each of the remaining resistors 223 and 224 until the stepping ring 262 in FIG. 4 has reached the Z position. At this time, the position ring 61 is advanced to the next position removing the enabling signal on line 66. This disengages attenuator 46 from the control 60 so that the setting of resistors 220–224 is maintained.

After completing the setting of attenuator 46 the position ring returns to position A so that a finer setting can be performed on attenuator 42. The setting of attenuators 42–46 can be repeated as many times as is desirable. However, once the resistors in each attenuator have been set, the control 60 may be removed from operation. The transmitter 10 may now transmit pulses separated by intervals equal to the delay between taps 21–26. As described above, the output signal on terminal 51 may be sampled at the data pulse rate to determine whether a main peak is present at these times on tap 21. The transmitter 10 may continue to send data pulses and the output signal on terminal 51 may continue to be sampled until the data transmission channel 15 is changed. At this time the characteristic distortion is altered so that new settings of the variable attenuators 42–46 must be obtained.

The transmitter 10 may then transmit test pulses separated by intervals at least as long as the anticipated distorted wave. The attenuator control 60 is activated and the position ring 61 is set at position A. After all of the attenuators 42–46 have been set, the transmitter may again transmit closely spaced pulses.

Although the above embodiment employs a delay line 20 other means could be used to take samples of the incoming waveform at selected points. For example a single sampling circuit could be employed having the ability to hold the value of the sample taken. In this manner, a sample may be taken of the main peak and the value of the sample stored, for example, by charging a capacitor. More samples may be taken of the trailing portion of the distorted waveform and these values stored. Then, the samples thus stored may be selectively added together to determine the amount of attenuation that must be applied to each sample in order to make the summation approach zero.

In still another embodiment of the present invention, the incoming waveform could be sampled at the main peak and selected points in the training portion of the waveform. Each of the samples could be converted into a digital representation. Addition of the digital samples could be performed by conventional digital computer techniques. Where the present invention is embodied in an entirely digital fashion, the settings of the attenuators 42–46 would be analogous to digital weighting values to be stored in the computer. Once the weighting values have been determined in accordance with the present invention, the incoming waveform can be sampled, and each sample multiplied by the weighting values before being added together.

It is also apparent that while the present invention has been described with reference to positive main peaks, the same operation can be achieved where negative main peaks are received.

Another modification of the system in FIG. 1 can be made where the characteristic distortion of the transmission channel 15 causes one or more peaks of distortion to precede the main peak. In order to compensate for the preceding peaks as well as the trailing peaks, additional elements and taps may be added to the right of tap 21 in delay line 20. Additional phase splitting amplifiers and variable attenuators may be connected to the added taps. Adjustment of the additional attenuators is performed when the main peak arrives at the associated tap in the same manner as described above.

Finally, although the specific details of attenuator control 60 and variable attenuators 42–46 were described and illustrated in FIGS. 3 and 4, any servo-mechanism could be employed to alter the magnitude of the signals appearing at taps 21–26. It is not necessary that a plurality of resistors such as resistor 220–229 be employed in each attenuator 42–46. In certain applications a potentiometer having a wiper arm under control of the servo-mechanism could serve to adjust the output appearing at taps 21–26, where speed of operation could be sacrificed.

While the invention has been particularly shown and described with reference to a preferred embodiment thereof, it will be understood by those skilled in the art that the foregoing and other changes in form and details may be made therein without departing from the spirit and scope of the invention.

We claim:

1. In a data transmission system including transmitter means for producing a test pulse, and transmission means connected to said transmitter means for transmitting and distorting said pulse so that a waveform is provided having the shape of a main peak and trailing peaks of lesser amplitude, the combination therewith of a receiver connected to receive the waveform provided by said transmission means, said receiver comprising:

sampling means for sampling said main peak and at least one point in the trailing portion of said waveform; and canceling means for adding a selected quantity of the sample of said main peak to the sample of said trailing portion of said waveform, said quantity being selected so that the result of said addition approaches zero.

2. Apparatus as in claim 1 wherein said sampling means samples a plurality of equally spaced points in the trailing portion of said waveform.

3. In a data transmission system, the combination comprising:

transmitter means for producing a train of pulses each separated by N bit intervals of time;

transmission means connected to said transmitter for transmitting and distorting said train of pulses so that in response to each pulse, a waveform is provided having the shape of a main peak and trailing peaks of lesser amplitude, the total width of said waveform not exceeding said N bit intervals; and a receiver connected to receive the waveform provided by said transmission means, said receiver including, sampling means for sampling said main peak and a point in the trailing portion of said waveform separated by an amount of time equal to one of said bit intervals, and canceling means for adding a selected quantity of the sample of said main peak to the sample of said point, said quantity being selected so that the result of said addition approaches zero.

4. Apparatus as in claim 3 wherein said sampling means is capable of sampling a plurality of points in said training portion, each separated by an amount of time equal to one of said bit intervals, and said canceling means is capable of adding a selected quantity of the sample of said main peak to the samples of said trailing portion, said quantity being selected so that the result of said addition approaches zero.

5. In a data transmission system the combination comprising:

transmitter means for producing a train of pulses each separated by N bit intervals of time;

transmission means connected to said transmitter for transmitting and distorting said train of pulses so that in response to each pulse a waveform is provided having the shape of a main peak and trailing peaks of lesser amplitude, the total width of said waveform not exceeding said N bit intervals; and a receiver connected to receive the waveform provided by said transmission means, said receiver including, a delay line connected to receive said waveform, said delay line having a time delay not exceeding N bit intervals, and having a plurality of output taps each separated by a delay equal to one of said bit intervals, a plurality of amplitude adjusting means each one connected to a different one of said taps for adjusting the amplitude of the signals appearing at said taps, summing means for adding the outputs of said adjusting means, sampling means for sampling the output of said summing means when said main peak arrives at a selected one of said taps, and control means responsive to the output of said sampling means for controlling the adjusting means associated with said selected tap so that the output of said summing means approaches zero.

6. Apparatus as claimed in claim 5 wherein said sampling means sequentially selects said taps beginning with the tap closest to that end of said delay line which receives said waveform.

7. Apparatus as in claim 6, wherein said coupling means is further characterized by repeatedly selecting the same tap to permit a number of adjustments to the associated adjusting means before advancing to the next tap in the sequence.

8. Apparatus as in claim 7 further characterized by the addition of means for supplying said waveform directly to said summing means bypassing said delay means, whereby said summing means adds the waveform directly applied to the outputs of said adjusting means.

9. Apparatus as in claim 8 wherein said sampling means is further characterized by the addition of peak detecting means for detecting the appearance of a main peak in the received waveform, and clocking means connected to the output of said peak detector for generating a clock signal during each of said bit intervals in synchronism with the occurrence of said main peak.

No references cited.

NEIL C. READ, *Primary Examiner.*

H. I. PITTS, *Assistant Examiner.*

UNITED STATES PATENT OFFICE
CERTIFICATE OF CORRECTION

Patent No. 3,308,431 March 7, 1967

Emil Hopner et al.

It is hereby certified that error appears in the above numbered patent requiring correction and that the said Letters Patent should read as corrected below.

Column 10, line 18, and column 11, line 29, for "training" each occurrence, read -- trailing --.

Signed and sealed this 28th day of November 1967.

(SEAL)
Attest:

Edward M. Fletcher, Jr.
Attesting Officer

EDWARD J. BRENNER
Commissioner of Patents